United States Patent [19]

Rosenbaum

[11] 4,208,175

[45] Jun. 17, 1980

[54] COEXTRUSION FEEDBLOCK AND PROCESS

[75] Inventor: Larry A. Rosenbaum, Marion, Ohio

[73] Assignee: HPM Corporation, Mount Gilead, Ohio

[21] Appl. No.: 945,259

[22] Filed: Sep. 25, 1978

Related U.S. Application Data

[62] Division of Ser. No. 751,887, Dec. 17, 1976, Pat. No. 4,125,585.

[51] Int. Cl.$^2$ ............................................. B29D 23/04
[52] U.S. Cl. ................................ 425/131.1; 425/146; 425/462
[58] Field of Search ...................... 264/171, 173, 209; 425/133.1, 131.1, 462, 146

[56] References Cited

U.S. PATENT DOCUMENTS

| | | | |
|---|---|---|---|
| 3,099,860 | 8/1963 | Schippers | 264/209 |
| 3,223,761 | 12/1965 | Raley | 425/131.1 |
| 3,266,093 | 8/1966 | Corbett | 425/133.1 |
| 3,419,938 | 1/1969 | Sonia et al. | 425/133.1 |
| 3,447,204 | 6/1969 | Lainson | 425/133.1 |
| 3,504,402 | 4/1970 | Wetz et al. | 425/131.1 |
| 3,649,143 | 3/1972 | Papesh et al. | 425/114 |
| 3,716,612 | 2/1973 | Schrenk et al. | 264/173 |
| 3,737,260 | 6/1973 | Kaye | 425/133.1 |
| 3,924,990 | 12/1975 | Schrenk | 425/462 |
| 3,947,173 | 3/1976 | Dougherty | 425/113 |

*Primary Examiner*—Jeffery R. Thurlow
*Attorney, Agent, or Firm*—Albert L. Jeffers; John F. Hoffman

[57] ABSTRACT

A feedblock fashioned from a plurality of plates is disclosed which distributes two flows of dissimilar synthetic resinous materials into a radially stratified annular form for extrusion by a pipehead die. The feedblock is mounted on a pipehead with the plurality of plates defining material flow channels for three strata. Independently operable valves vary stratum thickness and assure radially matched flow conditions between strata at confluence. Each stratum is independently accelerated through a convergent channel to assure that a uniform circumferential distribution of flow conditions develops. Moreover, two strata are developed through channel systems which do not induce circumferential maldistribution. The third stratum is handled to eliminate circumferential maldistribution. Accordingly, the process and apparatus develop stable annular flow with radial stratification having neither radial nor circumferential maldistributions that may later interact to distort the strata.

5 Claims, 12 Drawing Figures

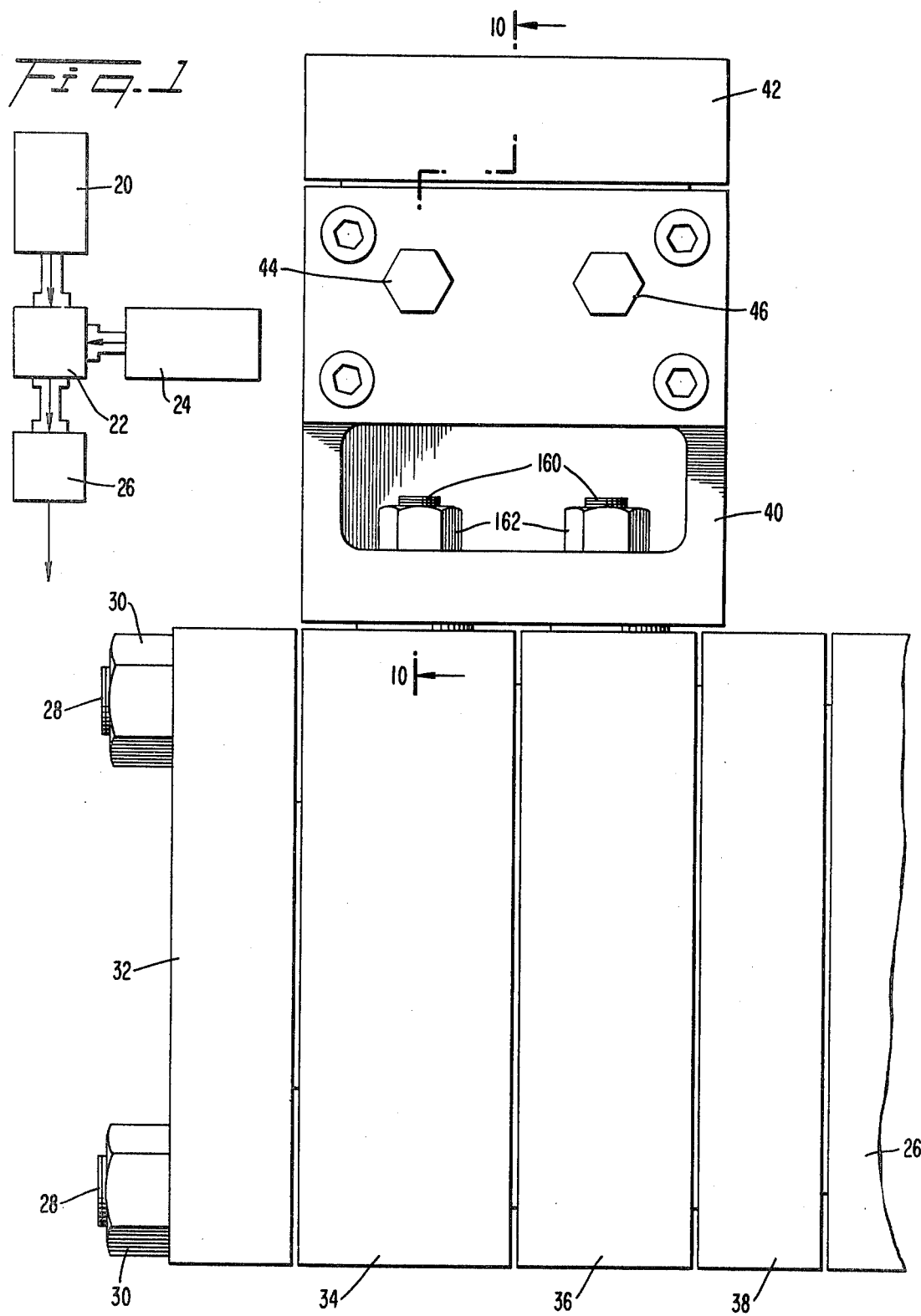

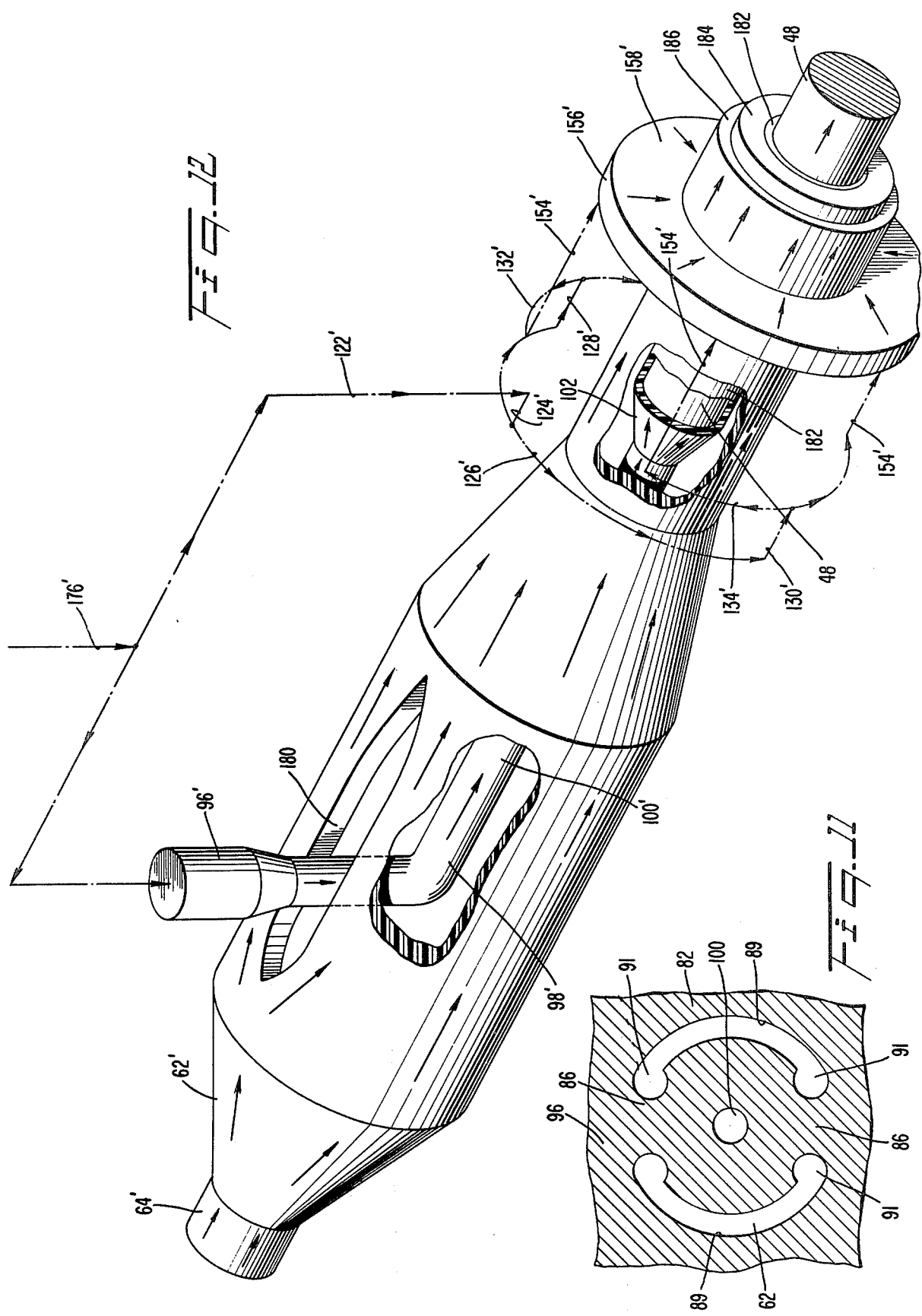

COEXTRUSION FEEDBLOCK AND PROCESS

This is a division of application Ser. No. 751,887, filed Dec. 17, 1976, now U.S. Pat. No. 4,125,585.

BACKGROUND OF THE INVENTION

The invention relates generally to a method and apparatus for preparing synthetic resinous materials for extrusion through a forming die. More particularly, the invention concerns a method and apparatus for preparing a radially stratified annular flow of dissimilar synthetic resinous materials for extrusion through a conventional forming die.

Extrusion of synthetic resinous material through a forming die to produce a self-supporting tube of indefinite length is well-known. However, extrusion of a tubular member of indefinite length having a radially stratified wall with inner and outer skins of one synthetic resinous material and a core of a second synthetic resinous material has presented problems to those skilled in the art.

A typical solution is the use of a multimanifold forming die having appropriate internal channels to distribute the resinous materials prior to extrusion through an orifice of the die to form a tube. However, a multimanifold forming die must be provided for each tube size to be extruded, and in addition, a conventional die must also be available to extrude a tube in the desired size from a single material. Accordingly, the capital investment required for both single layer wall and multiple layer wall tubing production in a range of sizes substantially exceeds the investment required for either single layer wall or multiple layer wall production alone.

An approach to reducing the capital expenditure required has been to use a feedback in multiple layer wall production that supplies an annular flow of radially stratified material to a conventional forming die. In this manner, the conventional forming die can be used for both single layer and multiple layer tubing.

One coextrusion feedblock is known but it has a configuration that is ill-suited for application to a variety of tubing sizes since scaling introduces substantial circumferential and radial maldistributions in the resulting annular flows. The maldistributions result, in part, from the confluence of decelerating flows and from distribution channels having inherent maldistributions.

The significance of circumferential and radial maldistributions is particularly exacerbated when dealing with self-supporting tubular members having skins comprising only a small portion of the total radial wall thickness. With small thickness strata circumferential maldistribution causes non-uniform wall thickness; radial maldistribution also contributes to non-uniform wall thickness.

The highly complex viscous properties of the synthetic resinous materials of commercial interest is another problem which has detracted from prior attempts to make an effective coextrusion feeding system. The highly viscous nature contributes to maldistribution of one layer with respect to a second layer where one flow is distributed circumferentially about the other. Where a viscous flow having a non-uniform distribution undergoes deceleration, an existing maldistribution is exaggerated.

Attempts to ameliorate such a maldistribution include adjustment of the slot through which a layer is distributed, but, such a design method limits the apparatus to a particular mass flow rate and is, therefore, not acceptable for commercial applications in which different materials and flow rates are necessary.

An example of a multimanifold die for forming multiwalled plastic film is found in U.S. Pat. No. 3,223,761, which issued Dec. 14, 1965. This die, however, forms all layers of the wall simultaneously at the end of a distribution tube. A distribution of this type decelerates the layers at the point of confluence as well as upstream thereof so that maldistributions are exaggerated. Moreover, radial maldistributions cannot be avoided as there is no means to adjust flow conditions of the layers at the point of confluence. The apparatus is further deficient in that the long axial distance between layer formation and development of annular flow allows small external temperature gradients to cause a phenomenon known as thermal drift in which dissimilar synthetic materials move through the apparatus in a non-axial fashion resulting in non-uniform layers.

Accordingly, the need continues to exist for truly effective feedblock which can distribute strata of a second synthetic resinous material on a first synthetic resinous material core for subsequent development into a self-sustaining tubular structure.

SUMMARY OF THE INVENTION

A coextrusion feedblock which overcomes problems with the known prior art preferably comprises a plurality of plates which are attached to the inlet of a pipehead die. The plates cooperate to define a first inlet opening communicating with a discharge zone through a core manifold means. The core manifold means develops a cylindrical flow of a first synthetic resinous material into an annular flow having no circumferential maldistribution and accelerates the annular flow to the discharge zone so as to further improve the circumferential distribution.

The plates also cooperate to define a second inlet opening communicating with the discharge zone through a skin manifold means that distributes a second synthetic resinous material in annular strata radially within and radially external to the annular flow of the first synthetic resinous material. The skin manifold means splits a cylindrical flow of the second material into a first branch channel means and a second branch channel means.

The first branch channel means carries a first portion of the second material to the discharge zone radially inside of the first annular flow and develops the second material into an annular stratum having no circumferential maldistribution. The first channel means also accelerates the second material passing therethrough into confluence with the first material to improve the circumferential distribution and to match flow conditions radially between the confluent strata.

The second branch channel means carries a second portion of the second material to the discharge zone and applies the second portion as a third stratum to the two confluent strata. In addition, the second branch channel means circumferentially distributes the second portion in a maldistribution-inducing cascade and erases the resultant maldistribution by, in part, accelerating the second portion into confluence with the previously developed strata in the discharge zone.

Independent valve means is provided for regulating the flow in each of the first and second branch channel means so that proportioning of the first and second portions can be controlled. Moreover, the valve means permits independent adjustment of the flow conditions in both the inner and outer strata at the plane of confluence with the annular flow so that radial maldistributions are avoided.

To reduce the axial length of the feedblock, the second branch channel means is provided with annular distribution stages that are closely spaced, in the axial sense. Moreover, the total flow path length through each cascade passage of the second branch channel means is minimized by locating the cascade passages at a uniform diameter radially close to the core manifold means and by allowing some cascade passages to be in counterflow relation to the core manifold means.

If desired, one or more additional strata of different material may be applied by adding additional plates which circumferentially distribute and accelerate the additional stratum into confluence with the previously developed strata.

According to the process of the present invention, the inner stratum of one material is accelerated and formed around a torpedo extending into the feedblock from the pipehead die to assure a uniform thickness in the inner skin. The core layer of a different material, having been shaped and accelerated, then moves in confluence with the inner skin through the discharge zone to the downstream end where the outer stratum of the one material, having been shaped and accelerated, is applied. The inner and outer strata are developed by splitting a flow of material and regulating the flow properties thereof so as to avoid radial maldistribution between adjacent strata in the discharge zone. In this manner, both radial and circumferential maldistributions are avoided so that comparatively thin strata can be uniformly applied.

BRIEF DESCRIPTION OF THE DRAWINGS

Many objects and advantages of the present invention will be apparent to those skilled in the art when this specification is read in conjunction with the drawings wherein like reference numerals have been applied to like elements and wherein:

FIG. 1 is a schematic illustration of the coextrusion formation of a tubular member of indefinite length;

FIG. 2 is a plan view of a feedblock assembly according to the present invention;

FIG. 11 is a partial cross-sectional view taken along the line 11—11 of FIG. 3; and FIG. 12 is a pictorial illustration of the flow of synthetic resinous material through the feedblock to produce a radially stratified flow of synthetic resinous materials.

DETAILED DESCRIPTION OF THE PREFERRED EMBODIMENT

Figure 3:
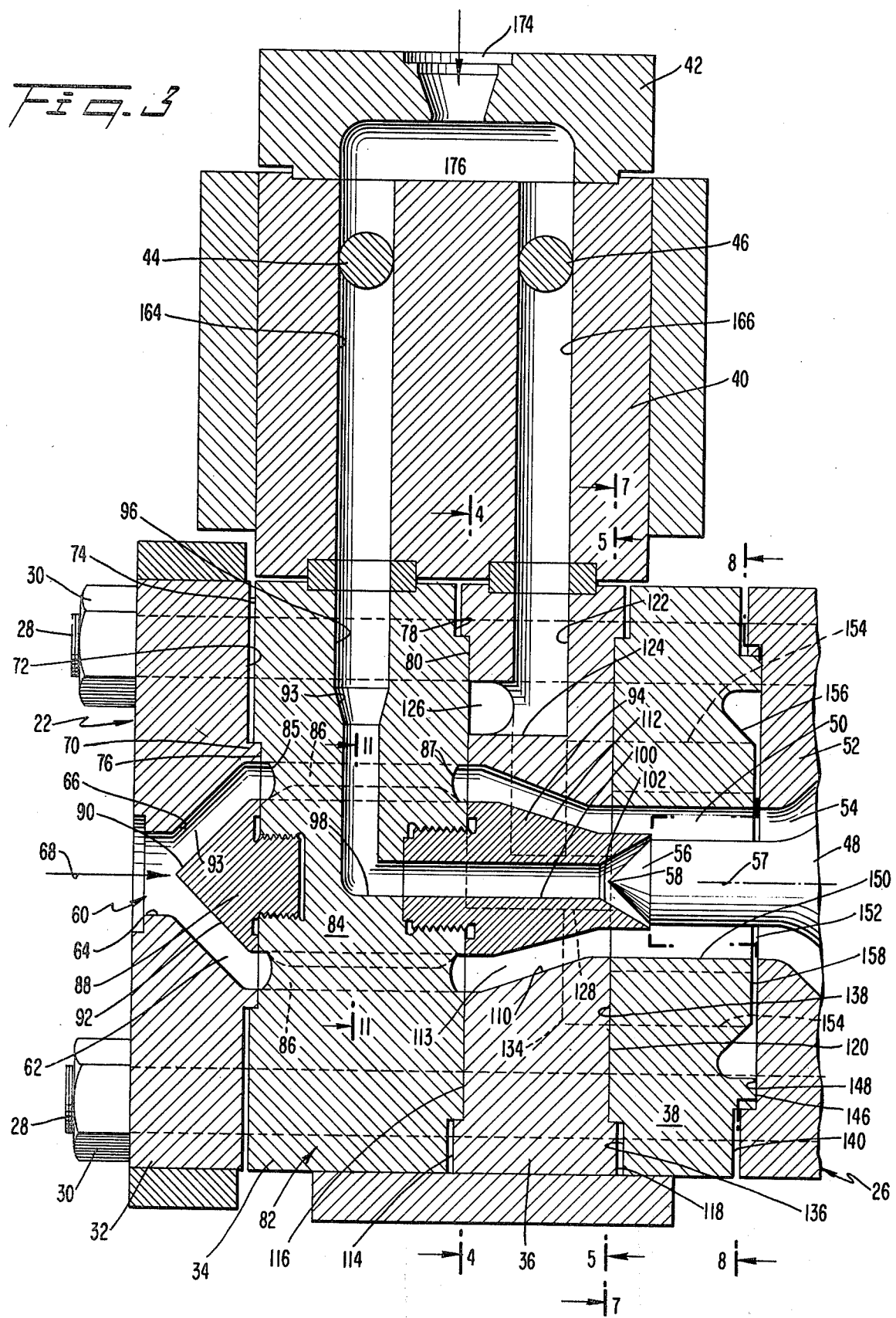
FIG. 3 is a partial cross-sectional view taken in a horizontal plane of the feedblock of FIG. 1.

Turning to FIG. 1, a suitable conventional extruder 20 prepares and plasticates a first synthetic resinous material and delivers it to a coextrusion feedback 22 according to the present invention. The feedblock 22 also receives a second flow of a dissimilar plasticated synthetic resinous material from a satellite extruder 24 which, like the first extruder 20, is of a suitable conventional design. The coextrusion feedblock 22 is operable to form a cylindrical flow of the first synthetic resinous material into an annular flow having a core of the first synthetic resinous material covered by inner and outer skins of the second synthetic resinous material. The feedblock 22 delivers the annular flow directly to the inlet of a suitable conventional forming device, such as a pipehead die 26, connected with the feedblock as schematically depicted. The pipehead die shapes the synthetic resinous material into a self-supporting tubular member of indefinite length.

The coextrusion feedblock 22 (see FIG. 2) is preferably fashioned from a plurality of generally parallel plates which are connected to the pipehead die 26 by a plurality of threaded studs 28 on which the plates are secured by corresponding nut 30.

The coextrusion feedblock 22 includes an inlet plate 32 which is operable for connection with the first extruder 20, as schematically illustrated in FIG. 1. In addition, the feedblock includes, in series, a spider plate 34 (see FIG. 2), a first distribution plate 36, and a second distribution plate 38. As will become apparent, these plates effect the distribution of the first and second synthetic materials into a radially stratified annular flow substantially free of radial and circumferential maldistributions which is then delivered to the pipehead die 26.

The feedblock assembly 22 also includes a valve block 40 mounted on one side of the spider plate 34 and the first distribution plate 36. A second inlet plate 42 is mounted on the valve block 40 and may be connected in a suitable conventional manner to the second or satellite extruder 24, as schematically illustrated in FIG. 1. The valve block 40 includes valve means including a pair of valve members 44,46 which are independently operable to control the thickness of the inner and outer strata of the resultant annular flow as well as to regulate flow conditions therein.

The feedblock 22 mounts directly to a conventional pipehead die 26, which requires only minor modification (see FIG. 3). The conventional torpedo is extended such that the torpedo 48 projects coaxially from the annular die inlet channel 54 beyond the face of the die 26 and into a discharge zone 50 of the feedblock 22. The die inlet channel 54 is defined by the torpedo 48 and the surrounding portion 52 of the pipehead die 26. The die inlet channel 54 extends through the die 26 to a forming orifice (not shown) so that an annular flow of synthetic resinous material is received, distributed, and formed into a tubular structure of indefinite length.

The distal end of the torpedo 48 is provided with a conical surface 56 having an apex which is coaxially aligned with a longitudinal axis 57 of the torpedo 48 and the die 26. The conical surface 56, having a sharp apex 58, is effective to coaxially pierce and distribute a cylindrical flow of material into an annular stratum or flow having substantially uniform radial thickness without introducing a circumferential maldistribution.

As noted, the feedblock 22 is adapted for connection to a first extruder and, therefore, is provided with a first inlet opening 60 through which a substantially cylindrical flow of a first synthetic resinous material enters the feedblock 22. The first inlet opening 60 is coaxially aligned with the axis 57 to reduce potential maldistribution and communicates with a core manifold means 62. The core manifold means 62 distributes the cylindrical inlet flow to an annular flow and ultimately delivers the annular flow to the discharge zone 50, which is also coaxial to the axis 57.

The core manifold means 62 includes a bore 64 which extends part way through the first inlet plate 32. The first inlet plate 32 also has a frustoconical surface portion 66 which expands radially outwardly from the bore 62 in the downstream direction (the direction of the arrow 68) to facilitate distribution of the cylindrical flow to an annular flow. The first inlet plate 32 also includes a downstream face 72 having a generally circular positioning projection 70 which projects in the downstream direction and is coaxial with the axis 57.

Downstream of the first inlet block 32 is the spider block 34 having an upstream face 74 with a substantially cylindrical positioning recess 76 coaxial with the axis 57. The positioning recess 76 has a diameter corresponding to the diameter of the positioning projection 70 of the first inlet plate 32 and receives the positioning projection 70 so as to concentrically align the first inlet plate 32 and the spider plate 34. The spider plate 34 also includes a downstream face 78 having a generally circular positioning projection 80 extending outwardly in the downstream direction and coaxial with the axis 57.

The spider plate 34 includes a peripheral portion 82 and a center body portion 84 which is coaxially positioned relative to the axis 57 and retained with respect to the peripheral portion 82 by one or more equiangularly spaced spiders 86. Each spider 86 has a sharp upstream edge 85 and a sharp downstream edge 87 which divide the flow of material passing through the spider plate 34. Preferably, there are two spiders 86 which are diametrically opposed.

The peripheral portion 82 and the center body portion 84 cooperate to define a substantially annular portion of the core manifold means 62 (see FIG. 11). As the core manifold means 62 encounters the spiders 86 it is bifurcated into two dog bone channels 89 each of which includes a reservoir portion 91 adjacent each spider 86. Each reservoir portion 91 accommodates half of the material displaced by the adjacent spider so that symmetry is preserved and the material in the remainder of the respective dog bone channel is not disturbed.

In addition, the center body 84 is provided with a threadably connected upstream nose cone 88 (see FIG. 3) having a conical surface 92 and a vertex 90 coaxial with respect to the axis 57. The surface 92 of the nose cone 88 extends into the frustoconical portion 66 of the first inlet plate 32 and cooperates therewith to define an annular channel 93. An incoming cylindrical flow is split by the apex 90 of the nose cone 88 and distributed into annular form along the annular channel 93. The annular flow then splits around the spiders 86 and recombines at the downstream edge 87.

Extending radially inwardly with respect to the axis 57 and through one spider 86 is a first branch channel means 96 adapted to receive a second synthetic resinous material to be applied as the inner stratum of a tubular structure. The branch channel 96 includes an accelerating constriction 93 and communicates with an axially extending bore 98 of the center body portion 84. The bore 98 is in coaxial alignment with the axis 57 and with a longitudinal bore 100 of a tail cone 94. The tail cone 94 is threadably attached to the downstream face 80 and includes a downstream end positioned closely adjacent to the distal end of the torpedo 48. The tail cone 94 also has an internal frustoconical surface 102 which increases in diameter from the longitudinal bore 100 to a diameter exceeding the diameter of the torpedo 48. Moreover, the internal frustoconical surface 102 and the conical end 56 cooperate to define a generally frustoconical channel which converges radially outwardly to a sharp edge 104 at the downstream end of the tail cone 94. Accordingly, as a cylindrical flow of a second synthetic resinous material enters the region between the conical end 56 and the frustoconical surface 102, the cylindrical flow is distributed into an annular flow without introducing a circumferential maldistribution and is accelerated by the convergent channel to the discharge zone 50.

Downstream of the spider plate 34 is the first distribution plate 36 which has a convergent frustoconical bore 110 coaxial with the axis 57. The frustoconical bore 110 cooperates with the external frustoconical surface 112 of the tail cone 94 to define an annular convergent portion 113 of the core manifold means 62. The first distribution plate 36 also includes an upstream surface 114, having a generally cylindrical recess 116 which receives the projection 80 of the spider plate 34 so as to concentrically position the bore 110 with respect to the axis 57. The first distribution plate also has a downstream face 118 with a generally cylindrical recess 120.

Figure 4:
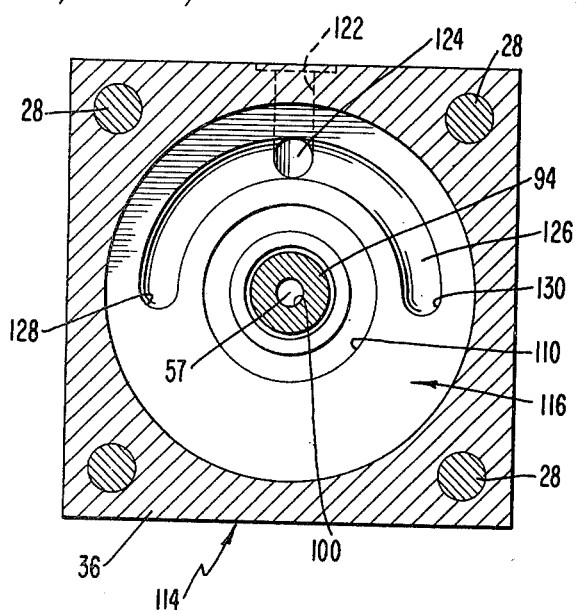
FIG. 4 is a reduced scale partial cross-sectional view taken along the line 4—4 of FIG. 3.

Extending radially into the first distribution plate 36, with respect to the axis 57, is a second branch channel means 122 adapted to receive a cylindrical flow of second synthetic resinous material. The second branch channel means 122 communicates at its end with an axially extending bore 124 communicating with the upstream face 114. In order to suitably distribute material in the second branch flow channel means 122 for application, the axial bore 124 communicates with the center of a substantially semi-circular channel 126 in the upstream face 116 of the first distribution plate 36. The semi-circular channel 126 has a U-shaped cross-sectional configuration and is positioned (see FIG. 4) in close relationship to the inner bore 110.

Figure 5:
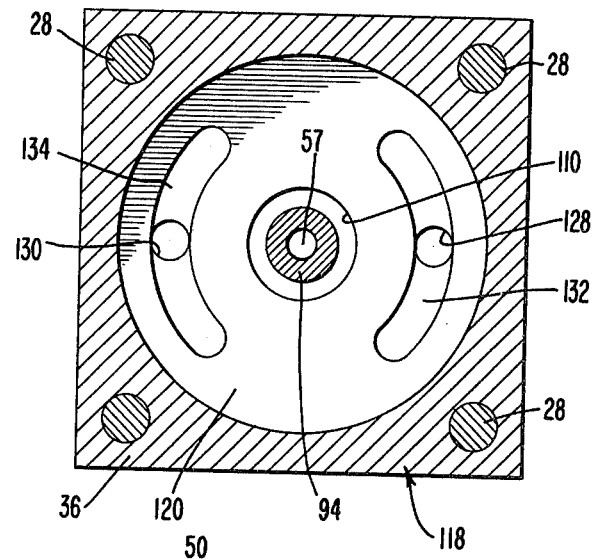
FIG. 5 is a reduced scale partial cross-sectional view taken long the line 5—5 of FIG. 3.
Figure 6:
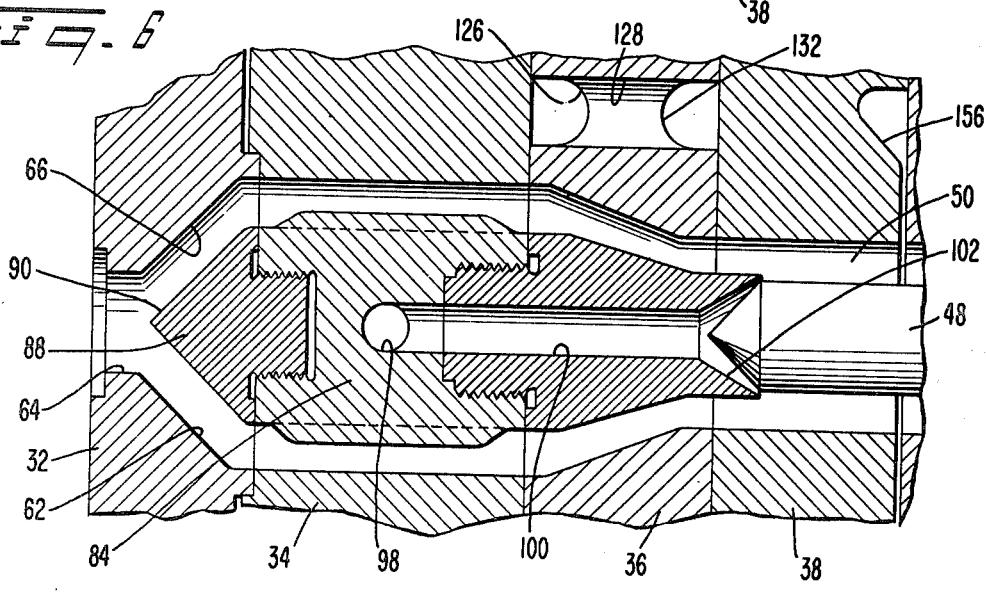
FIG. 6 is an enlarged partial cross-sectional view taken along the line 6—6 of FIG. 8.

Each end of the semicircular channel 126 communicates with a corresponding one of a pair of axially extending bores 128, 130. Each bore 128, 130 extends to the downstream face 118 (see FIG. 6) of the first distribution plate 36 and communicates with the center of a corresponding arcuate distribution groove 132, 134, in the downstream face 118. It will be observed from FIG. 5 that the arcuate slots 132, 134 are diametrically opposed from one another relative to the axis 57 and each subtend an angle of slightly more than 90 degrees. In the foregoing manner, material in the second branch channel means 122 is divided by the semicircular channel 126 into two essentially equal portions, each of which are subdivided into two essentially equal subportions by the corresponding arcuate distribution groove 132, 134.

A second distribution plate 38 (see FIG. 3) has an upstream face 136 with an axially extending cylindrical projection 138 which cooperates with the recess 120 in the downstream face 118 of the first distribution plate 36 to coaxially align the first and second distribution plates 36, 38. The second distribution plate 38 also includes a downstream face 140 having an axially extending cylindrical projection 146 which cooperates with a cylindrical recess 148 in the inlet end of the pipehead die 26 to coaxially position the second distribution plate 38 as well as the coextrusion feedblock assembly 22. The second distribution plate 38 also includes a generally cylindrical bore 150 extending between the upstream face 136 and the downstream face 140 which bore defines the discharge zone 50 of the feedblock assembly 22 and also defines a discharge opening 152 which communicates with the inlet of the pipehead die 26.

Figure 7:
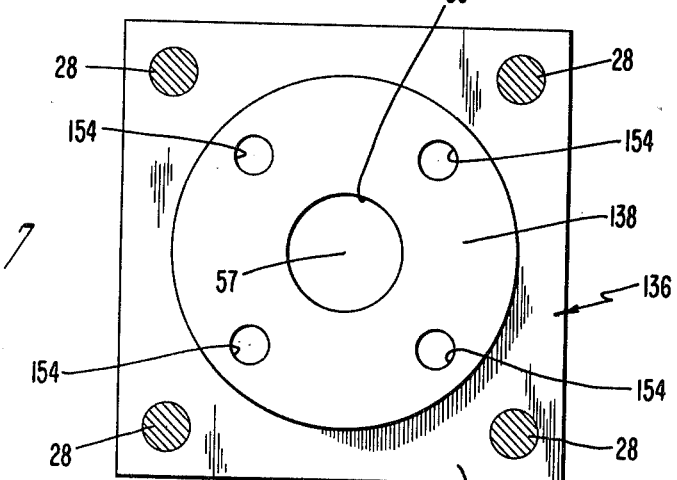
FIG. 7 is a reduced scale partial cross-sectional view taken along the line 7—7 of FIG. 3.
Figure 8:
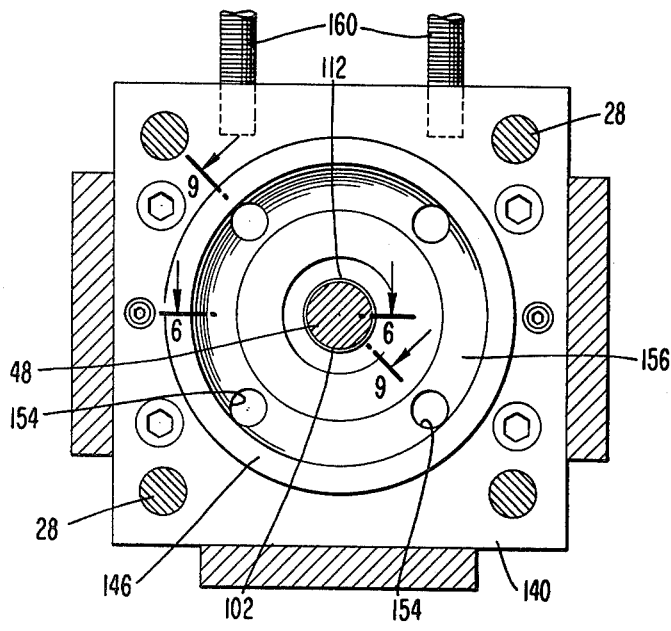
FIG. 8 is a reduced scale partial cross-sectional view taken along the line 8—8 of FIG. 3.
Figure 9:
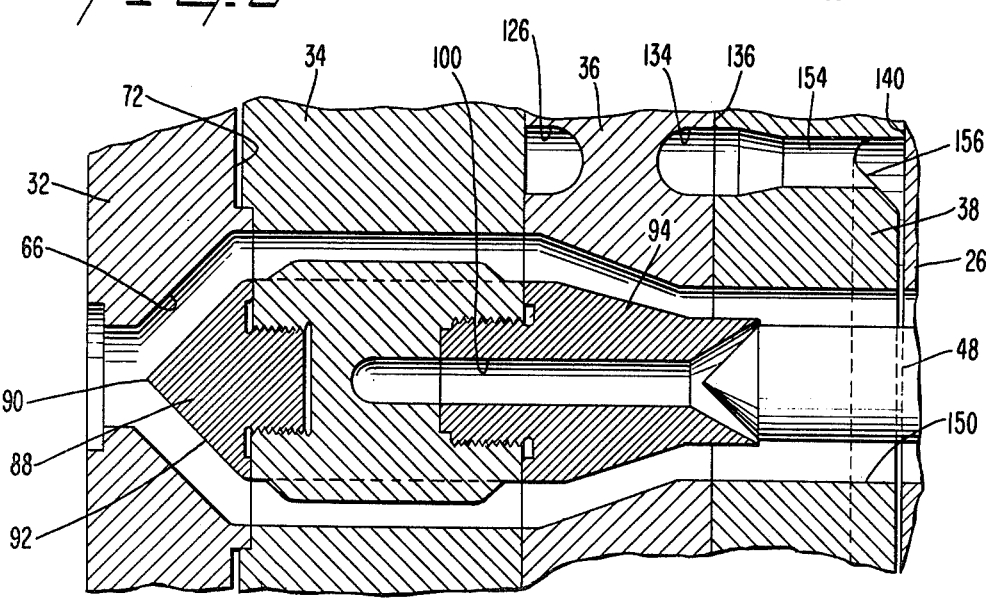
FIG. 9 is an enlarged partial cross-sectional view taken along the line 9—9 of FIG. 8.

The second distribution plate 38 is provided with four equiangularly spaced bores 154 (see FIG. 7) each of which extends between the upstream and downstream faces 136, 140 (see FIG. 9). Each bore 154 has an accelerating constriction and provides communication between a corresponding end of a corresponding arcuate channels 132, 134 and a plenum chamber 156 located in the downstream face 140. The plenum chamber 156 (see FIG. 8) is substantially annular, and (see FIG. 3) has a substantially triangular cross-sectional configuration. The downstream face 140 of the second distribution member 38 is slightly undercut between the plenum chamber 156 and the bore 150 to provide a generally radially inwardly extending channel 158 that defines a convergent flow passage between the plenum 156 and the downstream end of the discharge zone 50. The bores 154, the plenum chamber 156 and the channel 158 are additional portions of the second branch channel means 122.

Figure 10:
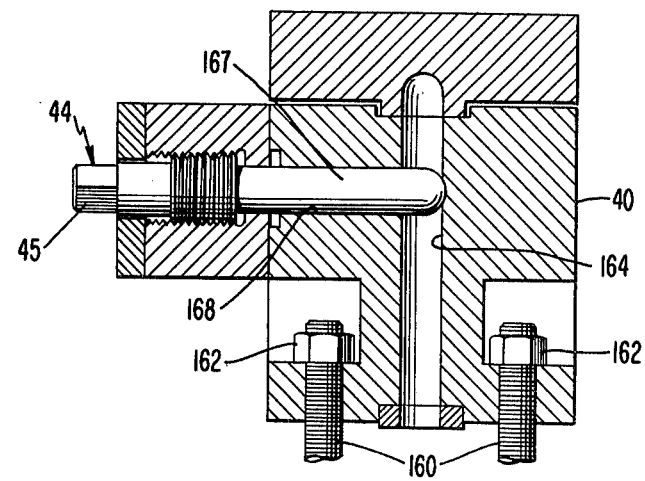
FIG. 10 is a reduced scale partial cross-sectional view taken along the line 10—10 of FIG. 2.

The first distribution plate 36 (see FIG. 2) and the spider plate 34 are each provided with a pair of bolt studs 160 which extend from one side. The valve body 40 (see FIG. 10) is mounted on the feedblock assembly by nuts 162 which connect the valve body 40 to the studs 160. The valve body 40 includes a pair of channels 164, 166 (see FIG. 3) each of which is part of and is generally aligned with the first branch channel means 96 of the spider plate 34 and the second branch channel means 122 of the first distribution plate 36, respectively. The valve members 44, 46 are substantially identical, and, therefore, the operation of only one needs description. With respect to FIG. 10, the valve includes an elongate valve body 167 which is mounted in a bore 168 of the valve body so as to be transversely oriented with respect to the channel 164. The valve body 167 is threadably mounted in the bore 168 so that rotation of the projecting end 45 causes the valve body 167 to advance or retract relative to the bore 168. In this manner, the valve opens or closes the channel 164.

By providing a valve 44, 46 for each of the channels 164, 166 the rate of flow of material through each of the first and second branch channels may be independently controlled. While adjustment of one of the valves 44, 46 is effective to adjust the relative proportion of flow passing between the two channels 164, 166, it is highly desirable to provide independent valving for both channels. In this manner by appropriate adjustment of both valves, the relative proportionate flow through each channel will remain unchanged, but the back pressure sensed by the satellite extruder 24 (FIG. 1) can be effectively adjusted so that operation of the satellite extruder can be controlled.

At the side of valve block 48 is the second inlet plate 42 (see FIG. 3) which includes the second inlet opening 174. The second inlet opening communicates with a passage 176 that splits the incoming flow into two portions. One end of the channel 176 communicates with the channel 164 and is part of the first branch channel means 96; whereas the second end of the channel 176 communicates with the second channel 166 and is part of the second branch channel means 122.

With the coextrusion feedblock assembly having been described, the operation of the feedblock assembly in the extrusion of a radially stratified annular flow will now be described in detail. To facilitate the description, the flow of plasticated synthetic resinous material through various channels of the coextrusion feedblock is illustrated in FIG. 12 in which reference numerals correspond to channels in the feedblock and are designated with a prime (').

Turning now to FIG. 3, a first flow of a first synthetic resinous material is supplied from the first extruder to the first inlet plate 32 of the coextrusion feedblock assembly 22. The first synthetic resinous material enters the feedblock as a first generally cylindrical flow through the inlet opening 60.

Upon passage through the first inlet block 32, the first flow is formed into an annular flow as it passes around the nose cone 88 and enters the generally frustoconical channel 93. The channel 93 thus spreads the first flow into an annular form which is discharged from the first annular plate 32 to the spider plate 34. As the first annular flow enters the spider plate 34, the sharp leading edge 85 of each spider 86 splits the first flow longitudinally and bifurcates it.

As the first flow passes the spiders 86, that portion of the first flow adjacent to each spider 86 moves circumferentially away from the spider 86 (see FIG. 11). The portion of the first flow displaced by the spiders 86 is received in the reservoir portions 91 of the bifurcated channels 89. In this manner, the flow disturbance caused by the spiders 86 is localized.

As the first flow of synthetic resinous material passes out of the bifurcated channels 89 and moves beyond the sharp downstream edge 87 of the spiders 86 (see FIG. 3), the enlarged reservoirs 91 fair into a fully annular flow path and cause the material flowing through the reservoir portions 91 to move into the portion of the annulus downstream of the spiders 86 (see FIG. 12).

The symmetry of the spider plate 34 (see FIG. 11) and the bifurcated channels 89 passing therethrough, in combination of the viscous nature of the first synthetic resinous fluid, causes the first flow to have substantially uniform circumferential flow properties at the downstream end of the spider plate 34.

To further mitigate any circumferential maldistributions in flow properties which may exist in the wake region downstream of each spider 86, the core manifold channel 62 (see FIG. 3) is provided with the frustoconical converging section 113 as in the first distribution plate 36. The annular flow of the first synthetic resinous material is accelerated by the frustoconical channel 113 while passing therethrough toward the discharge zone 50. The first synthetic resinous material enters the discharge zone 50 and is guided by the channel 62 to be co-axial with the axis 57.

Another flow of a second synthetic resinous material from the satellite extruder enters the second inlet plate 42 and is split by the passage 176 into a first portion which enters the channel 164 of the first branch channel means 96 and into a second portion which enters the channel 166 of the second branch channel means 122.

The valve means regulates the proportioning of the second cylindrical flow between the first and second branch channel means 96, 122. In this connection, either the valve 44 or the valve 46 may be used to adjust the relative flow distributions.

The first portion of the flow of second synthetic resinous material proceeds past the valve 44 and enters the spider plate 34. While passing through the spider plate 34, the first portion is accelerated by the convergent portion 93 of the channel. Acceleration of the highly viscous material reduces the material viscosity which, in turn, facilitates moving the material through a bend. Moreover, by reducing the passage diameter, circumferential thickness of the spider 86 can be reduced thereby lowering the blockage presented to flow in the core manifold channel 62.

The accelerated first portion then passes through a ring angle bend in the spider plate 34 and enters the bore 98 in general longitudinal alignment with the axis 67. The first portion then traverses the bore 100 of the tail cone 94 which, along with the bore 98, has an axial length sufficient to eliminate turbulence associated with the bend. Next, the first portion enters to convergent frustoconical accelerating passage in the second distribution plate 38 defined between the surface 102 of the tail cone 94 and the conical distal end 56 of the torpedo 48 (FIG. 3).

As the cylindrical flow from the bore 100 is shaped into an annular stratum and accelerated, any possible circumferential maldistribution is further erased. Accordingly, when the first portion enters confluent relationship with the first stratum of the first synthetic resinous material in the discharge zone 50, both strata are essentially free from circumferential maldistributions.

The second portion of the second synthetic material passes through the second branch channel means 122 in the first distribution plate 36 and turns forwardly into the axial bore 124. At this point, the second portion is in counterflow relationship to the first synthetic resinous material passing through the core manifold means 62. This counterflow relationship contributes to the comparatively short axial length of the feedblock assembly. The semi-circular channel 126 (see FIG. 4) divides the second portion into two substantially equal parts each of which flows circumferentially toward the respective end of the semi-circular channel 126. Each part of the second portion turns axially upon reaching the respective end of the semi-circular channel 126 into the co-flowing relationship with the first synthetic material passing through the core manifold channel 62. Each part passes through the corresponding bore 128, 130 and, on the downstream side of the first distribution plate 36, enters into a corresponding arcuate channel 132, 134 (see FIG. 5).

By discharging the second synthetic resinous material from the bores 128,130 at the center of the corresponding arcuate channel, each part of the second portion will be subdivided into substantially equal subportions. Each subportion flows circumferentially to the end of the corresponding arcuate channel and turns axially. Each subportion then flows through a corresponding one of the axial bores 154 (see FIG. 9) and through the second distribution plate 38. The subportions are each accelerated by the constricted portion of the bore 154 before being discharged into the plenum chamber 156 on the downstream face of the second distribution plate 38.

The subportions enter the plenum chamber 156 at the radially outer portion thereof in a direction which is substantially perpendicular to the direction material exhausts from the plenum chamber 156. In this manner, axial momentum of the fluid subportions entering the plenum chamber 156 is dissipated and therefore, is not free to accentuate a circumferential maldistribution. Moreover, by providing the circumferential plenum chamber 156 with a volume substantially greater than the volumetric flow rate of the second portion for a unit of time, material entering the plenum chamber 156 preferentially moves circumferentially with a comparatively slow velocity. In this fashion circumferential uniformity of flow properties is obtained within the plenum chamber 156.

From the radially outermost portion of the plenum chamber 156, the cross-section decreases in the radially inward direction (see FIG. 3) causing an acceleration of the second synthetic resinous material toward the radially inwardly convergent channel 158. The acceleration which occurs in the radially inner portion of the plenum chamber 156 and in the channel 158 is effective to further erase any circumferential maldistribution which might otherwise be present when four equiangularly spaced channels are used to apply a flowing stratum.

The flow from the channel 158 is applied to the outside of the first stratum, or core layer, at the downstream end of the discharge zone 50. Thus, at the downstream end of the discharge zone 50, a radially stratified annular flow results in which a core layer of a first material has inner and outer skins of a second material.

It will be noted that the plenum chamber 156 and the acceleration channel 158 are each defined in part by the forming die 26 and in part by the second distribution plate 38. In this manner, the axial length of the distribution plates can remain small and fabrication is facilitated by eliminating complex internal cavities.

As noted above, the valves 44, 46 (see FIG. 3) are used to adjust the relative flow proportions of the material passing through the first branch channel means 96 and the second branch channel means 122. But, the valves 44, 46 are also effective to match the radial flow conditions existing in the first and second portions of the second synthetic resinous material to the flow conditions existing in the annular stratum of the first synthetic resinous material at the respective planes of confluence in the discharge zone 50. More particularly, by appropriately adjusting the valves 44, 46, the pressure and velocity of each portion of the second synthetic resinous material can be adjusted to match the corresponding velocity and pressure of the first synthetic resinous material thereby avoiding radial maldistributions of flow properties. Thus, by appropriately adjusting the independently acuatable valves 44, 46, the flow split between the first portion and the second portion may be varied, and, in addition, the velocity and pressure of the first and second portions may be adjusted to match those of the first stratum. Accordingly, radial maldistributions are avoided between the adjacent strata by virtue of the valving arrangement and circumferential mal-distributions in each stratum are substantially eliminated by accelerating the viscous flows into confluent relationship in the discharge zone.

In the event that it is desired to add an additional stratum of synthetic resinous material to the radially stratified annular flow produced by the coextrusion feedblock, another pair of distribution plates, essentially similar to the first and second distribution plates 36, 38 may be attached to the downstream end of the second distribution plate 38. In this manner, an additional layer of synthetic material may be applied to the radially stratified structure as desired.

In addition, if it is necessary to provide additional distribution points in the annular plenum chamber 156, as may be desired in large diameter annular flows, one or more additional distribution plates may be inserted between the first and second distribution plates. Each additional distribution plate splits each subportion into two substantially equal smaller portions that pass through the second distribution plate 38 modified to have a channel 154 for each smaller portion, the channels being equiangularly spaced. In this manner, a coextrusion feedblock constructed in accordance with the present invention may be used to provide a radially stratified flow of material to a pipehead die having a nominal diameter in the range of one-half inch to sixty inches.

The present invention is primarily useful in the production of self-supporting thickwalled pipelike members. More particularly, films are generally classified as tubular members having a wall thickness on the average of less than or equal to 0.010 inches. Clearly, films are not self-supporting and do not experience the critical distribution problems present in the production of comparatively thickwalled pipes. Self-supporting pipes, on the other hand, typically have a wall thickness in the neighborhood of 0.060 inches or greater and will support their own weight when supported from the ends. In the such members inner and outer strata are often the primary load-bearing portions of the cross-section and therefore, precision thickness control is extremely necessary.

A coextrusion feedblock and process in accordance with this invention is efficacious in preparing a radially stratified flow for a pipehead die. In addition, the resulting annular flow is essentially free of radial and circumferential maldistributions of fluid conditions and properties. The flow conditions of inner and outer strata can be independently varied to match those of the core stratum. Moreover, the thickness of the inner and outer strata can be varied, as desired.

By accelerating each stratum prior to the location of confluence with an adjacent stratum, circumferential maldistribution of flow properties are erased. Moreover, by flowing adjacent strata together with sharp edges therebetween, stagnating regions with flow instability and eddy currents are avoided so that stratification is not disturbed.

By fashioning the feedblock from a plurality of plates, the feedblock is readily disassembled for cleaning. In addition, the number of strata can be increased by adding modules of distribution plates to the downstream end of the feedblock.

The feedblock and process are adapted for use in a wide range of physical sizes so that scaling problems do not present substantial difficulty or practical limitations.

By keeping the axial channels in the distribution plates quite short and by keeping the diameter of distribution channels as small as possible, the actual flow path length through each cascade path is identical and comparatively small so that the probability of the material degradation in small constricted channels is substantially eliminated. Moreover, the general coaxial alignment of all flow paths with the pipehead die contributes to the improved circumferential distributions of the fluid properties and conditions.

In accordance with this invention, a coextrusion feedblock process and assembly have been described which substantially satisfy the advantages outlined above. In addition, it will be apparent to those skilled in the art that numerous modifications, variations, substitutions and equivalents may be made for the features of the invention without departing from the spirit and scope thereof. Accordingly, it is expressly intended that all modifications, variations, substitutions and equivalents which fall within the scope of the invention as defined in the appended claims be embraced thereby.

What is claimed is:

1. A feedblock for preparing two dissimilar synthetic resinous material flows as an annular radially stratified flow with concentric strata for subsequent extrusion into a self-supporting tubular form, comprising body means operable to be connected with a die and including:

a first inlet opening operable to receive a cylindrical flow of a first synthetic resinous material;

a second inlet opening to receive a cylindrical flow of a second synthetic resinous material;

a discharge zone in which a radially stratified flow is developed, being generally coaxial with the first inlet opening;

core manifold means communicating with the first inlet opening and the discharge zone, including a generally circular inlet, and a first convergent annular channel downstream of the circular inlet operable to accelerate the first synthetic resinous material to the discharge zone as a first annular stratum with a uniform circumferential distribution of fluid properties;

skin manifold means communicating with the second inlet opening and including
      first branch channel means communicating with the discharge zone radially inside the core manifold means, having a channel coaxial with the discharge zone and being operable to apply a second annular stratum to the first stratum with a uniform circumferential distribution of fluid properties, and
      second branch channel means communicating with the discharge zone downstream of the first channel means, positioned radially outside of the core manifold means, and having a convergent annular channel discharging onto the discharge zone, being operable to accelerate a third stratum with a uniform circumferential distribution of fluid properties onto the first stratum; and valve means connected with the first branch channel means and the second branch channel means, operable to independently regulate the proportion of material passing through each branch channel means and to control radial distribution of fluid properties between the first and second and first and third strata.

2. The feedblock of claim 1 wherein the body means includes:

an inlet plate having the first inlet opening therein and the core manifold inlet extending therethrough such that a generally frustoconical bore is provided;

a spider plate having a centerbody coaxial with the frustoconical bore and cooperating with the core plate to define an annular channel with segments spaced by spiders, the first branch channel means passing through one spider and communicating with a channel extending to the discharge zone;

a first distribution plate having an upstream plate face, a downstream plate face, and a frustoconical channel therethrough coaxial with the centerbody and cooperating with the
centerbody to define the first convergent annular channel, the second branch channel means including a semicircular groove in the upstream plate face, a pair of diametrically opposed arcuate grooves in the downstream plate face, and a pair of bores each extending through the first distribution plate to provide communication between a corresponding end of the semicircular groove and the middle of a corresponding arcuate groove;

a second distribution plate having an upstream face, a downstream face, and a channel therethrough coaxial with the centerbody and surrounding the discharge zone, the second branch channel means including an annular plenum in the downstream face concentrically positioned relative to the channel, a plurality of equiangularly spaced bores, each communicating with the plenum and a corresponding end of the corresponding arcuate groove, and an undercut surface extending between the plenum and the discharge zone;

an inlet assembly connected to the spider plate and the first distribution plate, having the second inlet opening and housing the valve means; and means holding the inlet plate, the spider plate, the first and second distribution plates and the inlet assembly together.

3. Apparatus for extrusion of a tubular member of indefiite length with a wall consisting of a plurality of generally concentric layers, comprising:

pipehead means having an inlet opening from which an axially extending torpedo projects, and operable to form a tubular member from synthetic resinous material passing therethrough;

feedblock means having a discharge zone coaxial with the torpedo, a first inlet opening in coaxial alignment with the discharge zone, a second inlet opening, and further including core manifold means communicating with the first inlet opening and the discharge zone, operable to develop a cylindrical inlet flow into an annular flow and accelerate the annular flow to the discharge zone so that a uniform circumferential distribution of fluid properties is obtained in a first annular stratum, and skin manifold means communicating with the second inlet opening and the discharge zone having a first branch channel means *upstream of said torpedo and discharging onto said torpedo* with a portion coaxial to the torpedo and cooperating therewith to define a second convergent channel for spreading a second annular stratum on the first annular stratum in the discharge zone so that a uniform circumferential distribution of fluid properties is obtained in the second annular stratum, and a second branch channel means which applies material peripherally to the discharge zone through a third convergent channel at the interface between the pipehead means and the feedblock means, the third convergent channel accelerating a third stratum so that a uniform circumferential distribution of fluid properties is obtained; and means on the pipehead means for connecting the feedblock means and the pipehead means.

4. The apparatus of claim 3 wherein the feedblock means includes a plurality of plates with surface grooves and bores which modularize the second branch channel means of the skin manifold means.

5. The apparatus of claim 3 wherein the feedblock means includes valve means for independently regulating each of the first and second branch channel means to adjust relative flows therein and to control the fluid properties of adjacent strata so that radially uniform fluid properties prevail.

* * * * *